United States Patent
Muramatsu et al.

(10) Patent No.: US 6,491,290 B2
(45) Date of Patent: Dec. 10, 2002

(54) FLUID-FILLED VIBRATION DAMPING DEVICE HAVING PRESSURE RECEIVING CHAMBER WHOSE SPRING STIFFNESS IS CONTROLLABLE

(75) Inventors: Atsushi Muramatsu, Komaki (JP); Kazuhiko Kato, Komaki (JP); Motohiro Hatano, Kounan (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/877,274

(22) Filed: Jun. 7, 2001

(65) Prior Publication Data

US 2002/0005607 A1 Jan. 17, 2002

(30) Foreign Application Priority Data

Jul. 14, 2000  (JP) ........................................ 2000-214108

(51) Int. Cl.[7] .............................................. F16F 13/00
(52) U.S. Cl. ............................. 267/140.14; 267/140.13
(58) Field of Search ........................ 267/140.11, 140.13, 267/140.14, 140.15, 219; 248/562, 636

(56) References Cited

U.S. PATENT DOCUMENTS

| | | | | |
|---|---|---|---|---|
| 4,531,484 A | * | 7/1985 | Kimura et al. ............ 123/192 R |
| 4,828,234 A | * | 5/1989 | Hoying et al. ............ 267/140.1 |
| 4,893,797 A | | 1/1990 | Le Fol et al. | |
| 4,919,402 A | * | 4/1990 | Doi .......................... 267/140.1 |
| 5,145,156 A | | 9/1992 | Muramatsu et al. | |
| 5,170,998 A | | 12/1992 | Muramatsu | |
| 5,393,041 A | | 2/1995 | Takano et al. | |
| 5,407,169 A | * | 4/1995 | Tournier ..................... 248/550 |
| 5,628,499 A | * | 5/1997 | Ikeda et al. ............. 267/140.14 |
| 5,642,873 A | * | 7/1997 | Kato ........................ 267/140.14 |
| 5,769,402 A | * | 6/1998 | Ide et al. ................. 267/140.14 |
| 5,860,638 A | * | 1/1999 | Wolf et al. ............. 267/140.13 |
| 5,905,317 A | * | 5/1999 | Aoki ............................... 310/51 |
| 5,911,412 A | * | 6/1999 | Durand et al. .......... 267/140.13 |
| 5,992,833 A | * | 11/1999 | Tanahashi ............... 267/140.15 |
| 6,010,120 A | * | 1/2000 | Nagasawa ............... 267/140.14 |
| 6,082,718 A | * | 7/2000 | Yamada et al. ......... 267/140.14 |
| 6,120,012 A | * | 9/2000 | Shibata et al. .......... 267/140.14 |
| 6,176,477 B1 | * | 1/2001 | Takeo et al. ............ 267/140.11 |

FOREIGN PATENT DOCUMENTS

| | | | |
|---|---|---|---|
| JP | 61-190051 | | 11/1986 |
| JP | 2-129427 | | 5/1990 |
| JP | 4316734 A | * | 11/1992 |
| JP | 5118377 A | * | 5/1993 |
| JP | 6193670 A | * | 7/1994 |
| JP | 7-71506 | | 3/1995 |
| JP | 10148234 A | * | 6/1998 |
| JP | 11-6540 | | 1/1999 |

* cited by examiner

Primary Examiner—Matthew C. Graham
Assistant Examiner—Melody M. Burch
(74) Attorney, Agent, or Firm—Beyer Weaver & Thomas LLP

(57) ABSTRACT

A fluid-filled vibration damping device wherein two mutually spaced-apart mounting members are connected by an elastic body, which cooperate with an elastic wall member to partially define a pressure-receiving chamber, and a flexible diaphragm partially defines an equilibrium chamber on one side and a working air chamber on the other side. These chambers are filled with the non-compressible fluid and held in fluid communication with each other through the orifice passage. A negative pressure-regulating device applies different negative pressure to the working air chamber depending upon frequencies of vibration to be damped, so that a spring constant of the elastic wall member is changed corresponding to the vibration to be damped, thereby controlling a damping characteristics of the damping device.

10 Claims, 4 Drawing Sheets

FLUID-FILLED VIBRATION DAMPING DEVICE HAVING PRESSURE RECEIVING CHAMBER WHOSE SPRING STIFFNESS IS CONTROLLABLE

INCORPORATION BY REFERENCE

The disclosure of Japanese Patent Application No. 2000-214108 filed on Jul. 14, 2000 including the specification, drawings and abstract is incorporated herein by reference in its entirety.

BACKGROUND OF THE INVENTION

1. Field of the Invention

The present invention relates in general to a fluid-filled vibration-damping device, which exhibits a vibration damping or isolating effect based on flows or resonance of a non-compressible fluid contained therein. More particularly, the present invention is concerned with a novel fluid-filled vibration damping device which has a plurality of orifice passages tuned to respective different frequency bands of input vibrations and exhibits an excellent vibration damping effect with respect to the input vibrations having different frequencies or over a wide frequency range, based on the flows of the non-compressible fluid through these orifice passages.

2. Discussion of the Related Art

As one type of a vibration damper interposed between two members of a vibration system so as to connect these two members in a vibration damping manner or mount one of these members on the other member in a vibration damping manner, there is known, as disclosed in JP-U-61-190051, for example, a fluid-filled vibration damping device which includes: a first and a second mounting member that are disposed in mutually spaced-apart relationship with each other; an elastic body elastically connecting the first and second mounting members and partially defining a pressure-receiving chamber filled with a non-compressible fluid; and an easily deformable flexible diaphragm partially defining an equilibrium chamber filled with the non-compressible fluid and held in fluid communication with the pressure-receiving chamber through a first orifice passage. Such a known fluid-filled vibration-damping device is capable of exhibiting an excellent vibration damping effect based on resonance of the fluid flowing through the first orifice passage, which effect would not be achieved by only the elasticity of the elastic body. Therefore, the fluid-filled vibration-damping device is preferably usable as an engine mount for an automotive vehicle, for example.

Generally, the vibration damping or isolating effect of the known fluid-filled vibration damping device based on the flows or resonance of the fluid is exhibited with respect to only the particular input vibrations over a limited frequency range to which the first orifice passage is tuned. In particular, when the frequency of the input vibration is higher than the frequency band to which the first orifice passage is tuned, a resistance to flow of the fluid through the first orifice passage tends to be increased, making it difficult for the device to exhibit a satisfactory damping effect based on the fluid flows through the first orifice passage. In this case, the fluid-filled vibration-damping device exhibits a high dynamic spring constant, resulting in significant deterioration of the vibration damping characteristics.

To cope with this drawback, there is proposed another structure of the fluid-filled vibration damping device wherein the pressure-receiving chamber is partially defined by an elastically displaceable elastic wall member, as disclosed in JP-A-2-129427, for example. In this structure, the elastic wall member is displaced at a suitable frequency so that a periodic pressure change generated in the pressure-receiving chamber upon application of the higher frequency vibrations is reduced or absorbed, for preventing or minimizing an excessive increase in the dynamic spring constant of the device. There is also proposed yet another structure, as disclosed in JP-A-7-71506, wherein a partition member is disposed within the pressure-receiving chamber so as to divide the pressure-receiving chamber into two sections, namely a primary fluid chamber partially defined by the elastic body and a auxiliary fluid chamber partially defined by the elastic wall member, and a second orifice passage is formed for fluid communication between the primary and auxiliary fluid chambers. In this structure, the vibration damping device exhibits a low dynamic spring constant and an accordingly high vibration isolating effect based on flows of the fluid through the second orifice passage, upon application of high-frequency vibrations.

However, even in the provision of the elastic wall member or the second orifice passage, as described above, the fluid-filled vibration damping device still suffers from significant increase in the dynamic spring constant when the frequency of the input vibration is higher than the frequency band to which the elastic wall member or the second orifice passage is tuned, resulting in significant deterioration of the vibration damping characteristics of the device with respect to the higher frequency vibrations. Thus, the known fluid-filled vibration damping device suffers from significant difficulty in exhibiting an excellent vibration damping or isolating effect with respect to the input vibrations over a sufficiently wide frequency range.

SUMMARY OF THE INVENTION

It is therefore an object of the present invention to provide a fluid-filled vibration damping device which is novel in construction and which is capable of exhibiting an excellent vibration damping or isolating effect based on flows or resonance of a non-compressible fluid contained therein, with respect to input vibrations over a sufficiently wide frequency range.

The above and other objects of this invention may be attained according to the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whole specification and drawings or that may be recognized by those skilled in the art in the light of the disclosure in the whole specification and drawings.

(1) A fluid-filled vibration damping device comprising: a first and a second mounting member which are spaced apart from each other; an elastic body elastically connecting the first and second mounting members and partially defining a pressure-receiving chamber, the pressure-receiving chamber being filled with a non-compressible fluid whose pressure is changed upon application of a vibrational load between the first and second mounting members; an easily deformable flexible diaphragm partially defining an equilibrium chamber on one of opposite sides thereof, the equilibrium chamber being filled with the non-compressible fluid and has a volume easily variable; a first orifice passage for fluid communication between the pressure-receiving chamber and the equilibrium chamber; an elastic wall member being elastically displaceable and partially defining the pressure-receiving chamber; a restricting member disposed on one of opposite sides of the elastic wall member which is remote from the pressure-receiving chamber, the elastic wall member being elastically pressed to the restricting member; a working air chamber partially defined by the other side of the flexible diaphragm remote from the equilibrium chamber; and a negative pressure-regulating device adapted to apply different negative pressures to the working air chamber, depending upon frequencies of vibrations to be damped.

In the above-indicated mode (1) of the present invention, the pressure of the fluid within the pressure-receiving chamber is varied due to the elastic deformation of the elastic body, upon application of vibrational loads between the first and second mounting members. (a) Upon application of the vibrational loads over a low frequency band, the fluid is forced to flow through the first orifice passage between the pressure-receiving chamber and the equilibrium chamber, based on the fluid pressure difference between the pressure-receiving chamber and the equilibrium chamber, whereby the vibration damping device exhibits a high vibration damping effect with respect to the low frequency vibrations based on the resonance of the fluid flowing through the first orifice passage. (b) Upon application of the vibrational loads over a frequency band which is higher than the frequency band to which the first orifice passage is tuned, the fluid is forced to flow within the pressure-receiving chamber based on the elastic deformation of the elastic wall member, while the first orifice passage is substantially closed, whereby the vibration damping device exhibits a high vibrational isolating effect with respect to the relatively higher frequency vibrations, based on the resonance of the fluid flowing within the pressure-receiving chamber.

When the negative pressure is applied to the working air chamber, the flexible diaphragm is attracted to the side of the working air chamber, resulting in a reduced fluid pressure in the equilibrium chamber. The reduced pressure in the equilibrium chamber is transmitted to the pressure-receiving chamber through the first orifice passage, whereby the elastic wall member partially defining the pressure-receiving chamber is attracted to the side of the pressure-receiving chamber owing to its elastic deformation. Namely, the reduced fluid pressure applied to the elastic wall member acts to displace the elastic wall member in a direction remote from the restricting member against the elastic force of the elastic wall member in a direction toward the restricting member. This results in elastic deformation and displacement of the elastic wall member in the direction remote from the restricting member. In this condition, the elastic wall member is likely to be elastically deformable without being restricted by the restricting member. Thus, the spring constant of the elastic wall member is decreased, leading to a low wall spring stiffness of the pressure-receiving chamber. In this respect, the wall spring stiffness of the pressure-receiving chamber should be interpreted to mean an amount of fluid pressure change in the pressure-receiving chamber required to change a volume of the pressure-receiving chamber by a unit volume.

The application of the negative pressure to the working air chamber causes the decrease of the spring constant of the elastic wall member, so that the resonance frequency of the fluid flowing within the pressure-receiving chamber due to the elastic deformation of the elastic wall member shifts to the more lower frequency band. In the present fluid-filled vibration-damping device, therefore, the resonance frequencies of the fluid flowing within the pressure-receiving chamber can be changed by alternately turning ON and OFF the application of the negative pressure to the working air chamber, or alternatively by suitably regulating the level of the negative pressure applied to the working air chamber. Thus, the fluid-filled vibration-damping device can exhibit an excellent vibration damping or isolating effect with respect to vibrations over the different frequency bands.

In the fluid-filled vibration damping device constructed according to the present mode (1), the negative pressure applied to the working air chamber is not particularly limited, provided the negative pressure force is large enough to attract the elastic wall member to the side of the pressure-receiving chamber against the elastic force of the elastic wall member in the direction toward the restricting member, for thereby changing the wall spring stiffness of the pressure-receiving chamber. For instance, the working air chamber may be alternately exposed to the atmosphere and the negative pressure having a predetermined constant value.

Alternatively, the working air chamber is exposed to the negative pressure whose value is varied gradually or continuously. Further, the elastic wall member, partially defining the pressure-receiving chamber may be selected from a rubber plate member made of rubber material overall, or a canvas-reinforced or a rigid-material reinforced rubber plate member, for example. The elastic wall member may otherwise be formed of a combination of a rigid movable plate made of metal or synthetic resin materials and an elastic support fixed to the peripheral portion of the rigid movable plate for elastically support the rigid movable plate.

(2) A fluid-filled vibration damping device according to the above-indicated mode (1), wherein at least one of the elastic wall member and the restricting member has an abutting projection projecting therefrom toward the other of the elastic wall member and the restricting member, the elastic wall member being partially pressed to the restriction member at the abutting projection.

In this mode (2), the abutting part of the elastic wall member with respect to the restricting member is limited to the abutting projection. Therefore, the elastic wall member is likely to be elastically deformable at the part other than the abutting part, where the elastic wall member is not pressed to the restricting member, resulting in stability of the elastic deformation characteristics of the elastic wall member, and a resultant stability of the vibration damping characteristics of the damping device. Thus, the fluid-filled vibration-damping device of this mode (2) can exhibit a desired damping effect with high stability.

In this mode (2), at least one of the abutting parts of the elastic wall member and the restricting member is made of an elastic body, preferably. This arrangement is effective to reduce an impact noise upon collision of these abutting parts of the elastic wall member and the restricting member. It is also possible to provide a plurality of abutting projections between the elastic wall member and the restricting member. These abutting projections have different heights so that these abutting projections are sequentially brought into abutting contact with the elastic wall member or the restricting member, depending upon the level of the negative pressure applied to the working air chamber. This arrangement makes it possible to gradually change the elastic characteristics of the elastic wall member with high clarity and stability, depending upon the level of the negative pressure applied to the working air chamber. Preferably, each abutting projection is an annular member coaxially disposed about the center axis of the elastic wall member. The annular member extends continuously or discontinuously in its circumferential direction. The annular abutting projection ensures a stability of the elastic deformation of the elastic wall member with the each abutting projection held in abutting contact with the elastic wall member or the restricting member, leading to a resultant stability of the spring characteristics of elastic wall member.

(3) A fluid-filled vibration damping device according to the above-indicated mode (1) or (2), further comprising: a partition member which is adapted to divide the pressure-receiving chamber into a primary fluid chamber partially defined by the elastic body and an auxiliary fluid chamber partially defined by the elastic wall member; and a second orifice passage for fluid communication between the primary fluid chamber and the auxiliary fluid chamber, the second orifice passage being tuned to a frequency band which is higher than the frequency band to which the first orifice passage is tuned. In this mode (3) of the invention, the second orifice passage is formed within the pressure-receiving chamber for clearly defining the fluid passage through which the fluid flows within the pressure-receiving chamber upon application of the vibrational loads between the first and second mounting members. The presence of the second orifice passage facilitates flows of the fluid within the pressure-receiving chamber. The length and cross sectional area of the second orifice passage is suitably dimensioned so that the fluid-filled vibration damping device can exhibit an excellent vibration damping or isolating effect with respect to input vibrations over the specific frequency range.

(4) A fluid-filled vibration damping device according to the above-indicated modes (3), wherein one of the first and second mounting members is attached to a power unit of the vehicle, and the other of the first and second mounting members is attached to a body of the vehicle, such that the power unit is mounted on the body of the vehicle in a vibration damping fashion, the first orifice passage being tuned to a frequency band corresponding to that of engine shakes, the second orifice passage being tuned to a frequency band corresponding to a booming noise with the elastic wall member pressed to the restricting member, while being tuned to a frequency band corresponding to engine idling vibrations with the working air chamber exposed to the negative pressure.

In this mode (4), the vibration damping device is capable of exhibiting high damping effect with respect to vibrations required to damp in the vehicle, namely, the engine shakes and booming noises generated during running of the vehicle, and the engine idling vibrations generated during idling of the engine of the vehicle. While the negative pressure is applied to the working air chamber so that the vibration damping device exhibit a desired damping effect with respect to the engine idling vibrations, the negative pressure having a relatively high level is available from the air intake system of the engine, when the engine is in the engine idling mode. Thus, the vibration-damping device of this mode (4) effectively utilizes this high negative pressure to effectively control the damping effect thereof.

(5) A fluid-filled vibration damping device according to any one of the above-indicated modes (1)–(4), wherein the elastic wall member partially defines an interior space on the other side thereof remote from the pressure-receiving chamber, the interior space permitting an displacement of the elastic wall member and being exposed to the atmosphere through a communication hole.

In this mode (5) of the invention, the interior space partially defined by the elastic wall member is exposed to the atmosphere. This arrangement permits a stable displacement of the elastic wall member based on the negative pressure, which is applied to the working air chamber and acts on the elastic wall member via the non-compressible fluid filling the pressure-receiving chamber. Namely, the interior space exposed to the atmosphere is effective to prevent occurrence of a negative pressure within the interior space upon displacement of the elastic wall member, so that the elastic wall member is desirably displaced by applying the suitably regulated negative pressure to the working air chamber, without adverse influence of the occurrence of the negative pressure in the interior space. According to this mode (5) of the invention, the state or attitude of the elastic wall member may be desirably and effectively controlled by applying the suitably regulated negative pressure to the working air chamber. In addition, the interior space that is always exposed to the atmosphere is effective to reduce or prevent variation in temperature in the interior space, thereby eliminating or reducing possibility of undesirably variation in elastic characteristics of the elastic wall member and in the damping characteristics of the device, due to the temperature variation.

(6) A fluid-filled vibration damping device according to any one of the above-indicated modes (1)–(5), further comprising a pressure detecting device for detecting a pressure value of the non-compressible fluid, wherein the negative pressure applied to the working air chamber is corrected based on the pressure value detected by the pressure detecting device.

In this mode (6), the pressure of the fluid filled within he device is detected as a measurement. The obtained measurement is compared with the target value. Based on the difference between the obtained measurement and the target value, the negative pressure value applied to the working air chamber is controlled in a feedback fashion so that the negative pressure applied to the working air chamber has a target pressure value. This permits stabilized application of the negative pressure to the working air chamber and the elastic wall member, even if the negative pressure in the vacuum source varies. Thus, the vibration-damping device of the present mode (6) can exhibit desired vibration damping characteristics with high stability.

(7) A fluid-filled vibration damping device according to any one of the above-indicated modes (1)–(6), wherein the second mounting member includes a recess open to the first mounting member and a partition wall disposed within the recess such that the partition wall is located in an intermediate portion of the recess as seen in a depth direction of the recess, so as to fluid-tightly divide an interior space of the recess into a bottom-side space and an open-side pocket, the flexible diaphragm being disposed in the bottom-side space such that the flexible diaphragm fluid-tightly divide the bottom-side space into the equilibrium chamber and the working air chamber formed on the opposite sides of the flexible diaphragm, the elastic body elastically connecting the first mounting member and an open end portion of the open-side pocket of the second mounting member so that the open end portion of the open-side pocket is fluid-tightly closed by the elastic body, the elastic wall member being disposed in the bottom side of an interior space of the open-side pocket such that a peripheral portion of the elastic wall member is supported by an inner wall surface of the open-side pocket, while being pressed onto the partition wall, the pressure-receiving chamber being partially defined by and formed between the elastic body and the elastic wall member.

In this mode (7), the second mounting member has the above-indicated specific structure, namely has the recess. The recess of the second mounting member is effective to arrange the pressure-receiving chamber, equilibrium chamber, the working air chamber and the elastic wall member therein. This makes it possible to construct a desired fluid-filled vibration-damping device with a reduced number of component members and with a simple structure. While the space for installing an engine mount in a vehicle is limited, the present mode (7) permits to provide an engine mount with a compact size.

BRIEF DESCRIPTION OF THE DRAWINGS

The above and optional objects, features, advantages and technical and industrial significance of the present invention will be better understood by reading the following detailed description of presently preferred embodiments or modes of the invention, when taken in connection with the accompanying drawings, in which.

DETAILED DESCRIPTION OF PREFERRED EMBODIMENTS

Figure 1:
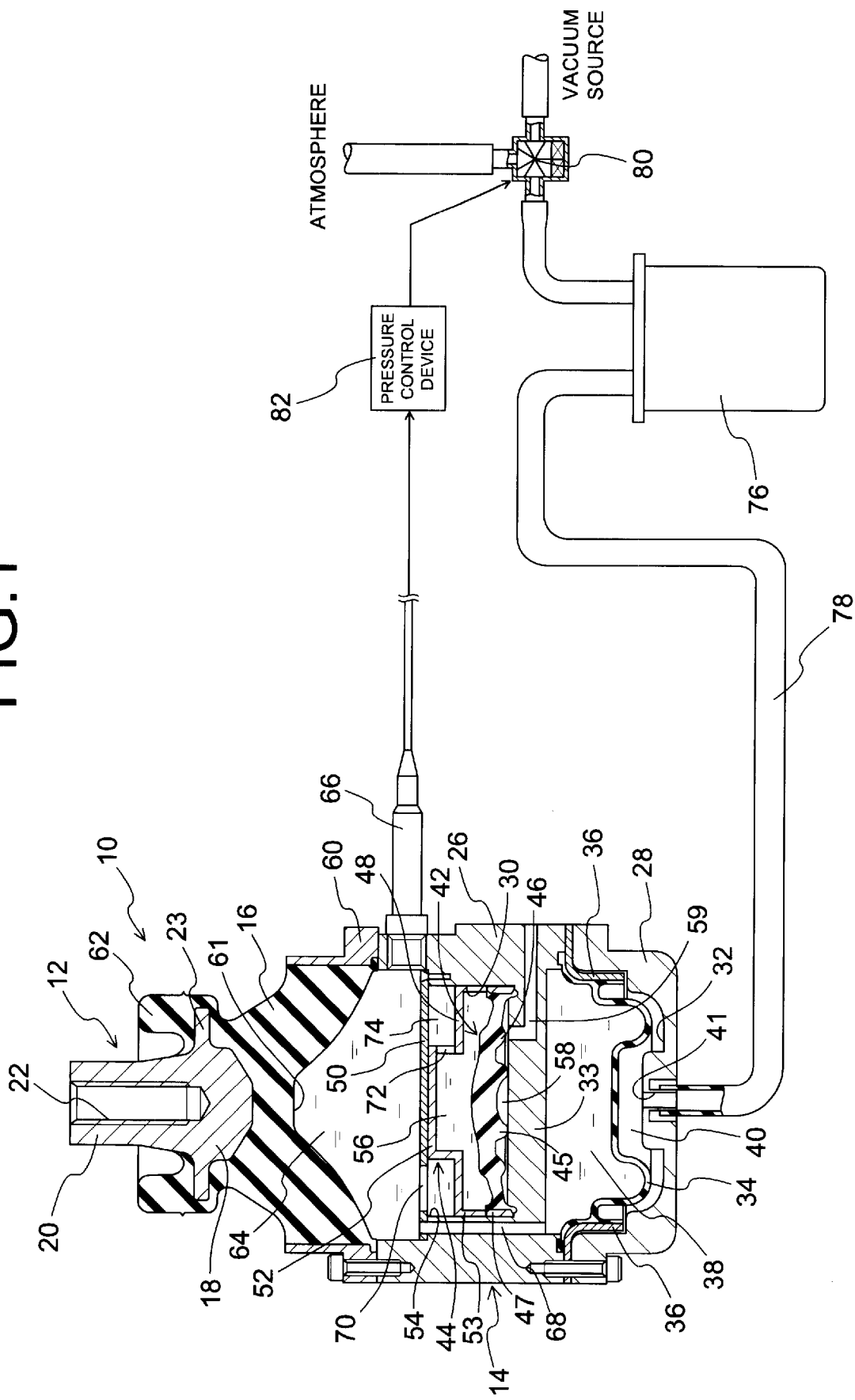
FIG. 1 is an elevational view in axial or vertical cross section of a fluid-filled vibration-damping device in the form of an engine mount constructed according to a first embodiment of the invention.

Referring first to FIG. 1, there is shown an engine mount 10 for a motor vehicle, as one embodiment of the fluid-filled vibration-damping device of the present invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material. The first and second mounting members 12, 14 are attached to a power unit and a body of the motor vehicle, respectively, so that the power unit, which includes an engine, is mounted on the vehicle body in a vibration damping fashion. With this engine mount 10 installed on the vehicle as described above, the elastic body 16 is held elastically compressed with the weight of the power unit acting on the engine mount 10. The engine mount 10 is installed so as to damp input vibrations which are applied in the direction in which the two mounting members 12, 14 are opposed to each other, namely, in the vertical direction as seen in FIG. 1 and in a direction almost parallel to the vertical direction.

The first mounting member 12 includes a body portion 18 having an inverted generally frusto-conical shape, and a threaded mounting portion 20 which is formed integrally with the body portion 18 so as to extend axially upwardly from the large-diameter end of the body portion 18. The threaded mounting portion 20 has a tapped hole 22 open in its upper end face and extending in its axial direction. The first mounting member 12 further includes a stopper portion 23 having an annular plate-like shape, which is formed integrally with the body portion 18 at its large-diameter end, so as to extend radially outwardly from the outer circumferential surface of the body portion 18. The first mounting member 12 is fixedly attached to the power unit of the vehicle by a fastening bolt (not shown) threaded into the tapped hole 22 of the threaded mounting portion 20.

The second mounting member 14 consists of an upper metal member 26 and a lower metal member 28 each having a generally cylindrical shape. The upper and lower metal members 26, 28 are superposed on each other in their axial direction such that axes of these members 26, 28 are aligned with each other, and are bolted together, thereby cooperating with each other to provide the second mounting member 14. With the upper and lower metal members 26, 28 assembled together as described above, the interior space of the second mounting member 14 is fluid tightly divided at its axially intermediate portion by a bottom wall portion 33 of the upper metal member 26. Namely, the opening of a central recess 32 of the lower metal member 28 is fluid-tightly closed by the bottom wall portion 33 of the upper metal member 26, to form a fluid-tightly closed bottom space, while the opening of the upper metal member 26 is kept open, to form a pocket open to the axially upward direction.

Within the bottom space defined by the central recess 32 of the lower metal member 28, there is disposed an easily deformable flexible diaphragm in the form of a flexible thin rubber layer 34. The thin rubber layer 34 has a generally circular bowl-like shape. The thin rubber layer 34 is bonded at its peripheral portion to the inner circumferential surface of a metallic sleeve 36 upon vulcanization of a rubber material for forming the thin rubber layer 34. The metallic sleeve 36 has an outward flange integrally formed at its axially upper end portion. The outward flange of the metallic sleeve 36 is forcedly supported by and between the outer peripheral portions of the upper and lower metal members 26, 28, so that the thin rubber layer 34 is fixedly supported at its peripheral portion by the second mounting member 14. In this condition, the thin rubber layer 34 fluid-tightly divides the bottom space defined by the recess 32 into two sections formed on both sides thereof.

Namely, the thin rubber layer 34 cooperates with the bottom wall portion 33 to define therebetween an equilibrium chamber 38 whose volume is variable based on deformation of the thin rubber layer 34. The equilibrium chamber 38 is filled with a suitable non-compressible fluid such as water, alkylene glycol, polyalkylene glycol or silicone oil. The thin rubber layer 34 also cooperates with the lower metal member 28 to define therebetween a working air chamber 40. The presence of the working air chamber 40 allows the deformation of the thin rubber layer 34. The working air chamber 40 is connectable to an external air source (not shown) via a port 41 formed through a central part of the bottom wall portion 33 of the lower metal member 28.

Within a central recess 30 of the upper metal member 26, there is disposed an elastic wall member in the form of a rubber plate 42 and a partition member in the form of an orifice member 44. The rubber plate 42 is a generally circular disk shaped member. The wall thickness of the rubber plate 42 is dimensioned to be larger than at least the thickness of the thin rubber layer 34 and to be large enough to exhibit a desired elasticity by which the rubber plate 42 restore to a substantially constant original shape thereof.

Figure 2:
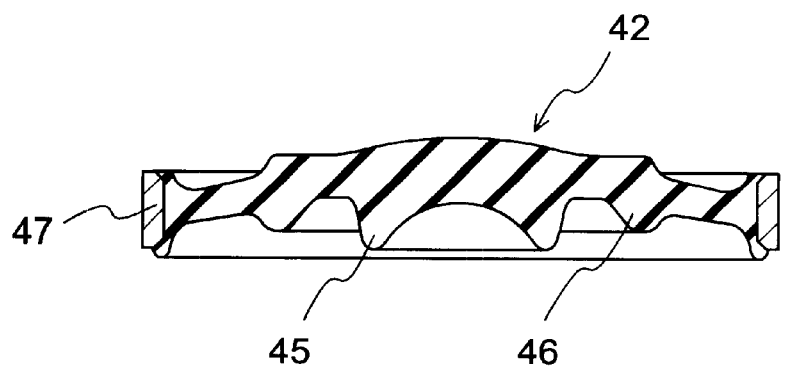
FIG. 2 is an axial or vertical cross sectional view of a rubber elastic plate as a component of the engine mount of FIG. 1.
Figure 3:
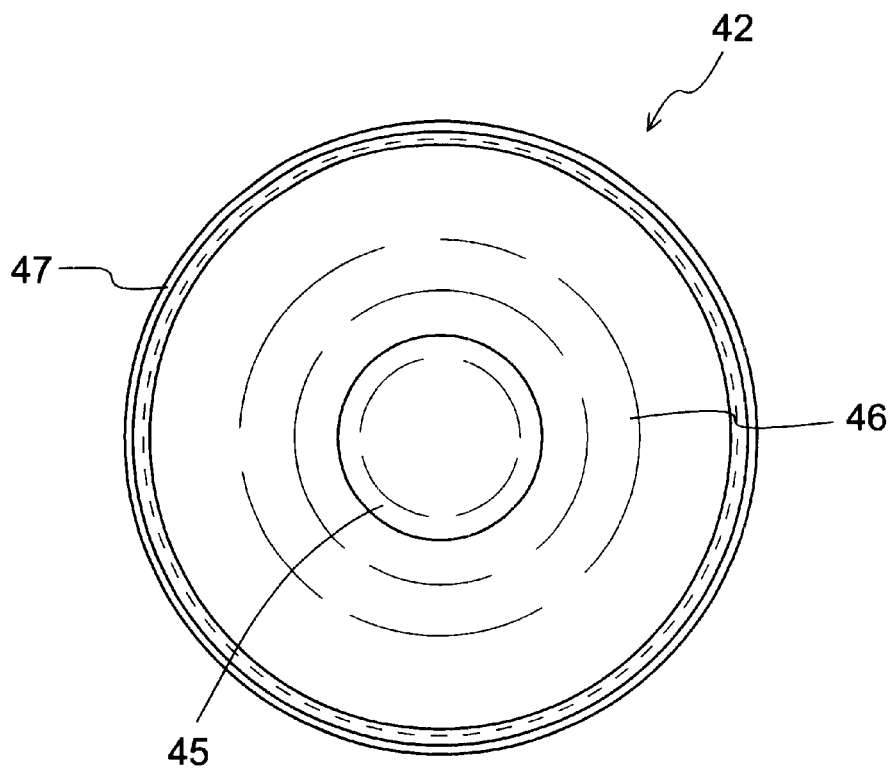
FIG. 3 is a bottom plane view of the rubber elastic plate of FIG. 2.

More specifically, the rubber plate 42, as its original shape, has a central portion which is slightly projected in its axially upward direction as seen in FIG. 2, and whose wall thickness is slightly larger than that of its peripheral portion. The rubber plate 42 includes an annular abutting projection 45 integrally formed at the radially intermediate portion of the lower surface thereof so as to protrude axially outwardly (downwardly as seen in FIG. 2) from the lower surface. The abutting projection 45 extends continuously in its circumferential direction, and is disposed in substantially coaxial relationship with the rubber plate 42. For preventing stress concentration, the radially inner part of the protruding end portion of the abutting projection 45 has a round shape. The rubber plate 42 includes an annular thick-walled portion 46 located radially outwardly of and coaxially with the abutting projection 45. The thick-walled portion 46 serves to adjust elastic characteristics of the rubber plate 42.

The rubber plate 42 is bonded at its outer circumferential surface to the inner circumferential surface of a metallic ring 47 upon vulcanization of a rubber material to form the rubber plate 42. The metallic ring 47 fixed with the rubber plate 42 is press-fitted into the central recess 30, such that the rubber plate 42 is located in the axially lower or bottom part of the central recess 30 so as to extend in a radial direction perpendicular to the axial direction. With the metallic ring 47 assembled with the upper metal member 26 as described above, the rubber plate 42 is forcedly pressed at a protruding end portion of the abutting projection 45 on the bottom wall portion 33 of the upper metal member 26. That is, the rubber plate 42 is assembled with respect to the upper metal member 26 such that the rubber plate 42 forces its abutting projection 45 onto the bottom wall portion 33 based on its elasticity, and such that diametrically inner and outer portions of the lower surface of the rubber plate 42 is spaced apart from the bottom wall portion 33 of the upper metal member 26 by a slight axial distance. In this condition, the elastic deformation of the rubber plate 42 is restricted at the abutting projection 45 thereof by the bottom wall portion 33 of the upper metal member 26, while being relatively easily allowed at the radially inner and outer sides of the abutting projection 45 of the rubber plate 42. That is, the bottom wall portion 33 of the upper metal member 26 serves as a restricting member to which the rubber plate 42 is elastically forced.

On the other hand, the orifice member 44 consists of a disk-like shaped bottom plate 48 and a closure plate 50 which are both made of metallic materials and which are superposed on each other in the axial directions. The center portion of the bottom plate 48 is projected axially upwardly to form a circular protrusion 52, while the peripheral portion of the bottom plate 48 is bent axially downwardly as seen in FIG. 1, to form a cylindrical fixing portion 53. The thus formed bottom plate 48 is forcedly pressed into and fixedly disposed within the central recess 30 and such that the fixing portion 53 of the bottom plate 48 is press fitted into the inner circumferential surface of the central recess 30, while being superposed on the metallic ring 47 in its axial direction. With the bottom plate 48 disposed within the central recess 30 as described above, the outer circumferential surface of the circular protrusion 52 and the inner circumferential surface of the central recess 30 are opposed to each other with a radial spacing therebetween and cooperate to partially define therebetween an annular groove 54 extending in the circumferential direction and open toward the axially upward direction. The closure plate 50 is placed on and fixed to the protruding end face of the circular protrusion 52 of the bottom plate 48, so that the opening of the annular groove 54 is fluid tightly closed by the closure plate 50.

With the rubber plate 42 and the orifice member 44 being assembled with the upper metal member 26 as described above, the central recess 30 is fluid-tightly divided at its axially intermediate portion by the orifice member 44 into upper and lower sections formed on both sides thereof. The lower section is further divided by the rubber plate 42 into an auxiliary fluid chamber 56 formed on the upper side of the rubber plate 42 and an interior space in the form of an internal air chamber 58 formed on the lower side of the rubber plate 42.

The auxiliary fluid chamber 56 is partially defined by and between the rubber plate 42 and the orifice member 44, and has a volume that is variable due to the elastic deformation of the rubber plate 42. Like the equilibrium chamber 38, the auxiliary fluid chamber 56 is filled with the non-compressible fluid such as water, alkylene glycol, polyalkylene glycol or silicone oil. The internal air chamber 58 is partially defined by and between the rubber plate 42 and the bottom wall portion 33 of the upper metal member 26, and serves to allow the elastic deformation of the rubber plate 42. In the present embodiment, an air vent 59 is formed through the bottom wall portion 33 of the upper metal member 26 such that the air vent 59 extends radially inwardly from the outer circumferential surface of the upper metal member 26 so as to open in the internal air chamber 58. That is, the internal air chamber 58 is held in communication with the atmosphere through the air vent 59 so that the air pressure within the internal air chamber 58 is kept in the atmospheric pressure.

The upper and lower metal members 26, 28 constructed as described above are integrally bolted together, thereby forming the second mounting member 14 having a generally cylindrical cup shape and open to the first mounting member 12. The first and second mounting members 12, 14 are disposed coaxially with each other with a suitable axial spacing therebetween. The first and second mounting members 12, 14 are elastically connected with each other by the elastic body 16 interposed therebetween. The elastic body 16 has a generally frusto-conical shape having a relatively large diameter. The first mounting member 12 and the elastic body 16 are bonded together such that the body portion 18 of the first mounting member 12 is embedded in the small-diameter end portion of the elastic body 16. To the outer circumferential surface of the large-diameter end portion of the elastic body 16, there is bonded a generally cylindrical connecting metal member 60 having a large diameter in the above-indicated process of vulcanization. Thus, an integral vulcanized assembly consisting of the first mounting member 12, the elastic body 16 and connecting metal member 60 is formed. The connecting metal member 60 is superposed on and fastened by bolt to the open end face of the upper metal member 26 of the second mounting member 14 such that the connecting metal member 60 is fluid tightly pressed onto the open end face of the upper metal member 26. Thus, the outer circumferential part of the large diameter end portion of the elastic body 16 is fixed to the second mounting member 14.

The elastic body 16 has a large-diameter recess 61 open in its large-diameter end face. The provision of the recess 61 effectively reduces or prevents occurrence of tensile stress in the elastic body 16 when the engine mount 10 is installed on the vehicle and the weight of the power unit acts thereon. On the stop portion 23 of the first mounting member 12, there is formed a rubber buffer 62 integrally formed with the elastic body 16 such that the rubber buffer 62 extends in the axially upward direction from the stop portion 23. This rubber buffer 62 is provided for cushion-like abutting contact of the stop portion 23 with a stop portion (not shown) provided on the side of the vehicle body, for limiting the distance of displacement of the elastic body 16 in a rebound direction, i.e., in a direction in which the first and second mounting members 12, 14 are spaced apart from each other.

The elastic body 16 elastically connecting the first and second mounting members 12, 14 partially defines a primary fluid chamber 64 formed between the first and second mounting members 12, 14. Namely, the opening of the central recess 30 formed in the second mounting member 14 is fluid-tightly closed by the elastic body 16, thereby forming the primary fluid chamber 64 partially defined by and between the elastic body 16 and the orifice member 44. Like the equilibrium chamber 38 and the auxiliary fluid chamber 56, the primary fluid chamber 64 is also filled with the non-compressible fluid. The pressure of the fluid filling the primary fluid chamber 64 is variable based on the elastic deformation of the elastic body 16 upon application of the vibrational load between the first and second mounting members 12, 14. The filling of the primary fluid chamber 64, the equilibrium chamber 38 and the auxiliary fluid chamber 56 with the non-compressible fluid may be accomplished by assembling the connecting metal member 60 and the second mounting member 14 within a mass of the fluid, for example. Alternatively, the assembling of connecting metal member 60 with the second mounting member 14 is executed in the atmosphere, and the non-compressible fluid is then pour within these chambers 64, 38, 56 through a pouring hole which is fluid-tightly closed by a suitable closing member such as a blind rivet after the pouring of the fluid is completed. It should be appreciated that the primary and auxiliary fluid chambers 64, 56 cooperate to provide a pressure-receiving chamber in the present embodiment.

A pressure-detecting device in the form of a pressure sensor 66 is fixed to the outer circumferential surface of the upper metal member 26 for directly detecting the pressure of the fluid within the primary fluid chamber 64. The pressure sensor 66 may be selected from various kinds of known pressure sensors including conductor-type, piezoelectric-type and capacitance type. The pressure sensor 66 may be desirably fixed to the outer circumferential surface of the upper metal member 26. For instance, the pressure sensor 66 is fluid-tightly threaded into a tapped hole formed through the outer circumferential wall portion of the upper metal member 26.

Further, the upper metal member 26 has a first orifice passage 68 formed therethrough so as to extend in its axial direction. The first orifice passage 68 is open at its upper end to the primary fluid chamber 64 and at its lower end to the equilibrium chamber 38, assuring a fluid communication between these chambers 64, 38. Upon application of a vibrational load to the engine mount 10, the elastic body 16 is elastically deformed, causing a pressure change of the fluid in the primary fluid chamber 64, and accordingly causing a pressure difference between the fluid in the primary fluid chamber 64 and the equilibrium chamber 38. Based on this pressure difference, the fluid is forced to flow through the first orifice passage 68 between the primary fluid chamber 64 and the equilibrium chamber 38.

The orifice member 44 separates fluid-tightly the primary fluid chamber 64 and the auxiliary fluid chamber 56 formed on the both sides thereof from each other. The orifice member 44 has two communication holes 70, 72 that are formed at respective circumferential positions. The annular space defined by and between the annular grooves 54 formed in the bottom plate 48 and the closure plate 50 as described above, is held in fluid communication with the primary and auxiliary fluid chambers 64, 56 through the communication holes 70, 72, respectively. Thus, the annular space and the communication holes 70, 72 cooperate to define a second orifice passage 74, which permits a fluid communication between the primary and auxiliary fluid chambers 64, 56. Upon application of vibrations to the engine mount 10, the fluid is forced to flow through the second orifice passage 74 between the primary and auxiliary fluid chambers 64, 56, based on the pressure difference between the primary and auxiliary fluid chambers 64, 56.

In the present embodiment, the resonance frequency of the fluid flowing through the first orifice passage 68 is tuned to a desirable frequency band, which is lower than the frequency band to which the resonance frequency of the fluid flowing through the second orifice passage 74 is tuned. Described in detail, the first orifice passage 68 is tuned so as to exhibit a high damping effect with respect to low-frequency vibrations at around 10 Hz, such as engine shakes, on the basis of the resonance of the fluid flowing therethrough, at its initial state where the working air chamber 40 and the internal air chamber 58 are open to the atmosphere. On the other hand, the second orifice passage 74 is tuned so as to exhibit a low dynamic spring constant and an accordingly high vibration isolating effect with respect to high-frequency vibrations within a band of about 60 Hz–100 Hz, such as low or medium speed booming noise, based on the resonance of the fluid flowing therethrough.

The first and second orifice passages 68, 74 are easily tuned to the respective desired frequency bands, by suitably adjusting the cross sectional areas and the lengths of the orifice passages 68, 74, taking into account the wall spring stiffness values of the primary, auxiliary and equilibrium fluid chambers 64, 56, 38, and the density of the fluid contained within the engine mount 10. In this respect, the "wall spring stiffness value" of the each chamber should be recognized as a value corresponding to the amount of change of the fluid pressure within the each chamber required to change the volume of the chamber by a predetermined volume. Generally, the resonance frequency of the fluid flowing through an orifice passage is made higher, by increasing a value of a ratio (A/L) of a cross sectional area: A to a length: L of the orifice passage.

The engine mount 10 constructed as described above further includes a negative pressure-regulating device for regulating a negative pressure applied to the working air chamber 40. The negative pressure-regulating device includes a vacuum tank 76 for reserving the negative pressure, an air piping system including an air conduit 78 for transmitting a negative pressure from the vacuum tank 76 to the working air chamber 40, a vacuum conduit for communication between the vacuum tank 76 and a vacuum source, e.g., an air intake system of the engine of the vehicle, and a pressure-regulating switch valve 80 for alternatively connecting and disconnecting the vacuum tank 76 to and from the vacuum and atmospheric conduits. The switching operation of the switch valve 80 is controlled by a pressure control device 82 so as to suitably regulate the level of the negative pressure within the vacuum tank 76. Described in detail, the pressure-regulating switch valve 80 is alternatively placed in two operating positions, namely, a "vacuum position" for communication of the vacuum tank 76 with the vacuum source, and an "atmospheric position" for communication of the vacuum tank 76 with the atmosphere.

Accordingly, the pressure-regulating switch valve 80 is held in the atmospheric position to keep the air pressure in the vacuum tank 76 in the atmospheric pressure. Where the pressure-regulating switch valve 80 is switched between the vacuum and atmospheric positions at a predetermined frequency, the duty ratio of the pressure-regulating switch valve 80 is suitably controlled so as to regulate the level of the negative pressure in the vacuum tank 76. The duty ratio of the pressure-regulating switch valve 80 is interpreted to mean a ratio of a time in which the pressure-regulating switch valve 80 is held in its vacuum or atmospheric position to the entire period of the switching operation of the pressure-regulating switch valve 80. For instance, the time in which the pressure-regulating switch valve 80 is held in its vacuum position is increased (i.e., the duty ratio of the pressure-regulating switch valve 80 is increased) for increasing the level of the negative pressure in the vacuum tank 76. The pressure control device 82 is adapted to suitably control the duty ratio of the switch valve 80, when the switch valve 80 is switched between the vacuum and atmospheric positions at a predetermined constant frequency. Thus, the level of the negative pressure in the vacuum tank 76 is desirably controlled.

The pressure-regulating switch valve 80 may be any switch valve capable of performing a switching operation at a desired frequency with stability for alternately connecting and disconnecting the vacuum tank 76 to and from the vacuum and atmospheric conduits. For instance, a three-port switch valve of poppet, spool or rotary type is preferably used as the pressure-regulating switch valve 80, which is desirably a solenoid-operated valve having a high control response.

While the level of the negative pressure in the vacuum tank 76 is regulated by controlling the duty ratio of the pressure-regulating switch valve 80 in the present embodiment, the negative pressure in the vacuum tank 76 may otherwise be controlled. For instance, the level of the negative pressure in the vacuum tank 76 may otherwise be regulated by a proportional electromagnetic regulator which is constructed by disposing in a portion of the vacuum conduit a pressure reducing valve or a pressure-regulating valve of direct driven type or relief type. The negative pressure thus stored in the vacuum tank 76 is applied to the working air chamber 40 through the air conduit 78.

The pressure control device 82 is adapted to receive a vehicle running or driving condition signal, as a reference signal. The running condition signal may be a signal indicative of the engine speed, a signal indicative of the vehicle running speed, a signal indicative of the currently selected position of a shift lever, a signal indicative of a temperature of an intake air, or the like. The switching operation of the pressure-regulating switch valve 80 is controlled based on the reference signal so that the negative pressure applied from the vacuum tank 76 to the working air chamber 40 is regulated corresponding to the vehicle running or driving condition. In this respect, input and output signals of an engine control unit is effectively utilized as the reference signal of the present embodiment.

Described more specifically, during the running mode of the vehicle, the pressure-regulating switch valve 80 is held in its atmospheric position so as to expose the working air chamber 40 to the atmosphere. With the working air chamber 40 exposed to the atmosphere, the rubber plate 42 partially defining the auxiliary fluid chamber 56 maintains its initial attitude or shape and is forced onto the bottom wall portion 33 of the upper metal member 26 owing to its own elasticity. In this condition, the engine mount 10 can exhibits the intended vibration damping effect as described above, based on the resonance of the fluid flowing through the first orifice passage 68, with respect to low frequency vibrations such as engine shakes, while exhibiting the intended vibration isolating effect as described above, based on the resonance of the fluid flowing through the second orifice passage 74, with respect to high frequency vibrations such as low or medium speed booming noises.

During the engine idling mode of the vehicle, the engine mount 10 is subjected to the engine idling vibrations whose frequency band is higher than the frequency band corresponding to the engine shakes, and lower than the frequency band corresponding to the low or medium speed booming noise. A resistance to flow of the fluid flowing through the first orifice passage 68 is significantly increased upon application of the engine idling vibrations, making it difficult for the engine mount 10 to exhibit a satisfactory damping effect based on the fluid flows through the first orifice passage 68 with respect to engine idling vibrations. Likewise, the second orifice passage 74 is tuned to the specific frequency band that is deviated from the frequency band corresponding to the engine idling vibrations, resulting in a failure of exhibiting a desired vibration isolating effect with respect to the engine idling vibrations.

In the engine idling mode of the vehicle, the pressure-regulating switch valve 80 is switched between its vacuum and atmospheric positions at a suitable frequency, or is held in its vacuum position, for thereby exposing the working air chamber 40 to the negative pressure at a suitable level. In this condition, the suitable level of negative pressure is applied to the auxiliary fluid chamber 56 through the equilibrium chamber 38, the first orifice passage 68, the primary fluid chamber 64 and the second orifice passage 74 in the order of the description. Accordingly, the rubber plate 42 is attracted or elastically deformed and displaced toward the side of the auxiliary fluid chamber 56 due to the pressure difference acting on the upper and lower surface of the rubber plate 42, as shown in FIG. 4.

Figure 4:
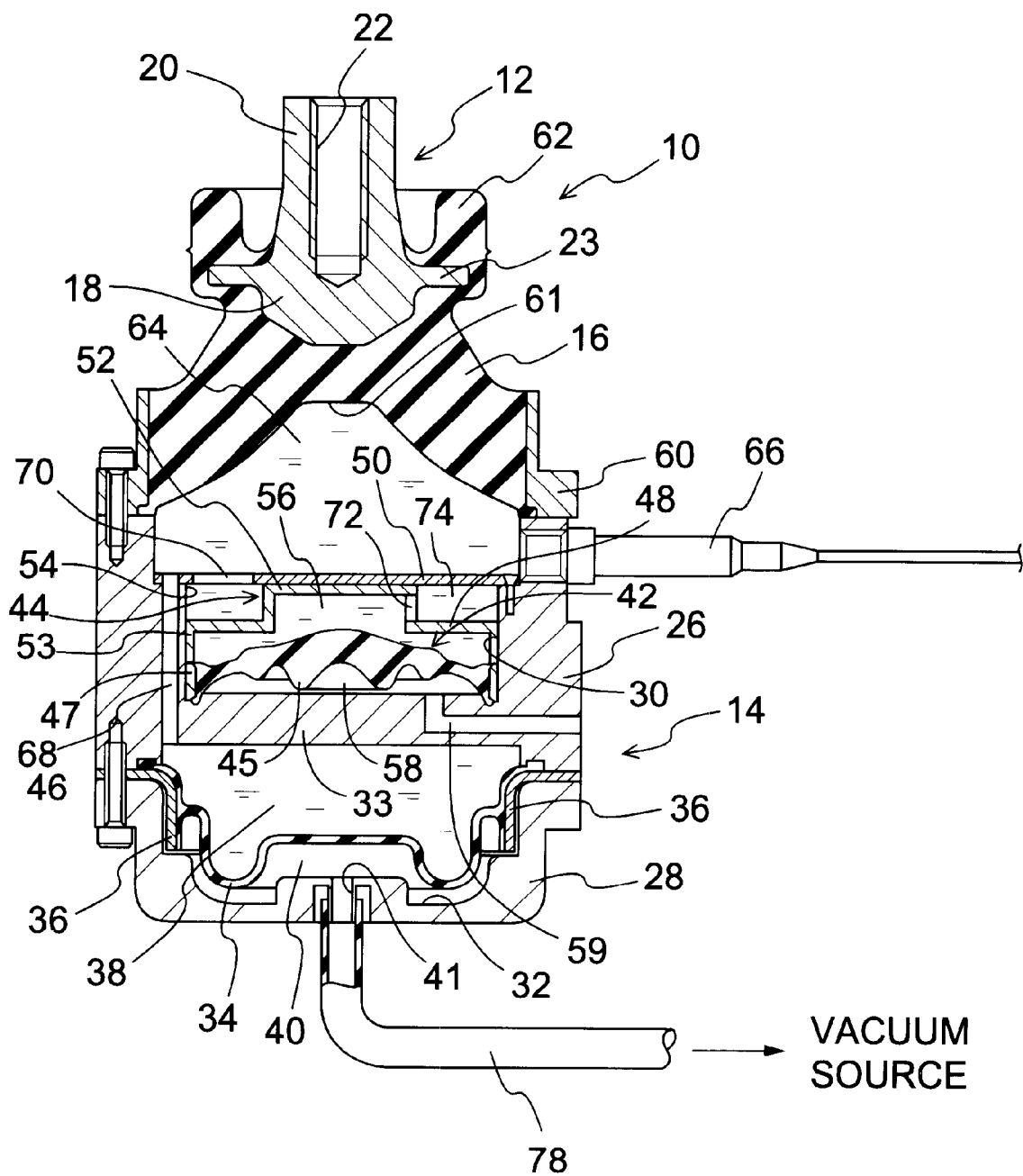
FIG. 4 is an elevational view in axial or vertical cross section of a principal part of the engine mount of FIG. 1, showing another operation mode of the engine mount.

As is apparent from FIG. 4, when the working air chamber 40 is exposed to the suitably regulated negative pressure, the abutting projection 45 of the rubber plate 42 is displaced upwards and spaced apart from the bottom wall portion 33 of the upper metal member 26 against its elasticity. Thus, the rubber plate 42 is free from restriction on its elastic deformation by the bottom plate portion 33. Namely, the rubber plate 42 is spaced apart from the bottom wall portion 33, so that the rubber plate 42 has a sufficiently large free length, or a sufficiently large area that is free to be elastically deformed. This results in that the overall spring constant of the rubber plate 42 is made lower than the overall spring constant of the rubber plate 42 in the case where the rubber plate 42 is forced onto the bottom wall portion 33 by its elasticity, facilitating the elastic deformation of the rubber plate 42. Accordingly, the wall spring stiffness values of the auxiliary fluid chamber 56 partially defined by the rubber plate 42 is made lower, whereby the resonance of the fluid forced to flow between the primary and auxiliary fluid chambers 64, 56 through the second orifice passage 74 is shifted to the frequency band lower than the resonance frequency of the second orifice passage 74 in an initial condition of the engine mount 10 where the working air chamber 40 is exposed to the atmosphere.

The spring characteristics of the rubber plate 42 and the length and cross sectional area of the second orifice passage 74 are suitably determined such that the resonance of the fluid flowing through the second orifice passage 74 is tuned to a specific frequency band corresponding to engine idling vibrations, in the vacuum-attracted condition of the engine mount 10 where the working air chamber 40 is exposed to the negative pressure and the rubber plate 42 is retracted and spaced apart from the bottom wall portion 33. In the vacuum-attracted condition of the engine mount 10, the engine mount 10 can exhibit an excellent vibration isolating effect with respect to an medium frequency vibrations such as the engine idling vibration, based on resonance of the fluid flowing through the second orifice passage 74.

It is noted that a relatively reduced air pressure or a relatively high negative pressure is available from the air intake system of the internal combustion engine, during the engine idling mode of the vehicle. Such a high negative pressure is utilized as the negative source and is applied to the working air chamber 40, permitting an efficient control of the vibration damping effect of the engine. In this case, the vacuum tank 76 is not necessarily needed to practice the present invention.

While the frequencies of the vibrations to be damped may be changed, when the vehicle driving mode is shifted from the engine idling mode to the running mode and then the vehicle is accelerated gradually, or when the vehicle speed is increased during the vehicle running mode, for example, the engine mount 10 constructed according to the present embodiment is capable of changing the spring characteristics of the rubber plate 42 and the resonance frequency of the fluid flowing through the second orifice passage 74, corresponding to the change of the frequencies of the vibrations to be damped, by suitably controlling the switching operation of the pressure-regulating switch valve 80 based on a vehicle running speed, an engine speed, or the like. Described in detail, the duty ratio of the pressure-regulating switch valve 80, namely, the ratio of a time in which the pressure-regulating switch valve 80 is held in its vacuum position to the entire period of one cycle of the switching operation of the pressure-regulating switch valve 80 is changed according to change of the frequencies of the vibrations to be damped caused by the change of the vehicle speed or the engine speed. Thus, the negative pressure applied to the working air chamber 40, i.e., the rubber plate 42 is suitably regulated according to the change of the frequencies of the vibrations to be damped.

According to the above-described control method for controlling the operation of the pressure-regulating switch valve 80, the engine mount 10 can exhibit an excellent vibration damping or isolating effect with respect to the booming noises whose frequency varies over the wide frequency range corresponding to a change of the vehicle running speed and the engine speed, based on the resonance of the fluid flowing through the second orifice passage 74 between the primary fluid chamber 64 and the auxiliary fluid chamber 56.

As is understood from the foregoing description, the pressure-regulating switch valve 80 and the pressure control device 82 cooperate to serve as a negative pressure-regulating means for regulating the level of the negative pressure applied to the working air chamber 40.

Where the operation of the pressure-regulating switch valve 80 is controlled by the pressure control device 82 on the basis of various kinds of detected signals such as a running speed signal, an engine speed signal, and a vibration signal, applied thereto, the pressure-regulating switch valve 80 may be controlled in a feed-forward fashion, on the basis of the detected signals, and according to stored predetermined data maps which are obtained by experimentation. While the present engine mount 10 includes the pressure sensor 66 adapted to detect the pressure of the fluid in the primary fluid chamber 64, the pressure control device 82 may be operable to control the operation of the pressure-regulating switch valve 80 in a feed-back fashion, on the basis of detected value of the fluid pressure in the primary fluid chamber 64, so that a desired negative pressure force is applied to the primary fluid chamber 64 through the working air chamber 40. In this case, the pressure control device 82 serves as a pressure-correcting device.

Where the air intake system of the internal combustion engine is utilized as the vacuum source, the level of the negative pressure available from the vacuum source is prone to change depending upon driving condition of the vehicle. Therefore, the feedback control of the pressure-regulating switch valve 80 on the basis of the detected fluid pressure value in the primary fluid chamber 64 permits an improved accuracy of the control of the operation of the pressure-regulating switch valve 80. In this respect, the fluid pressure value of the primary fluid chamber 64 may be detectable in any forms including a maximum value, a minimum value and an average value. The fluid pressure values in the equilibrium chamber 38, the auxiliary fluid chamber 56, and the vacuum tank 76 may be detected and utilized in place of or in addition to the detected fluid pressure value of primary fluid chamber 64

While the presently preferred embodiment of this invention have been described above for illustrative purpose only, it is to be understood that the present invention is not limited to the details of the illustrated embodiments, but may be otherwise embodied. For instance, the negative pressure-regulating means for controlling the negative pressure applied to the working air chamber 40 is embodied by incorporating the pressure sensor 66. It is noted that such a pressure sensor 66 is not essential to practice the present invention. Further, the pressure-regulating switch valve 80 may be a switch valve having a simple mechanism, instead of the solenoid operated switch valve used in the illustrated embodiment. In this case, the operation of the pressure-regulating switch valve 80 is controlled to be switched alternatively between its open and closed positions, rather than to regulate the duty ratio as in the illustrated embodiment. Described in detail, the pressure-regulating switch valve 80 is alternately switched between the open and closed positions depending upon whether the vehicle is in the engine idling mode or in the running mode of the vehicle, such that the working air chamber 40 is exposed to the negative pressure during the engine idling mode of the vehicle, and is exposed to the atmosphere during the running mode of the vehicle.

In the illustrated embodiment, the orifice member 44 functions as a partition member to divide the pressure-receiving chamber into the primary fluid chamber 64 and the auxiliary fluid chamber 56, and serves as the second orifice passage 74 to permit the fluid communication between the primary fluid chamber 64 and the auxiliary fluid chamber 56. The partition member and the second orifice passage 74 provided within the pressure-receiving chamber are not also essential to practice the present invention.

Figure 5:
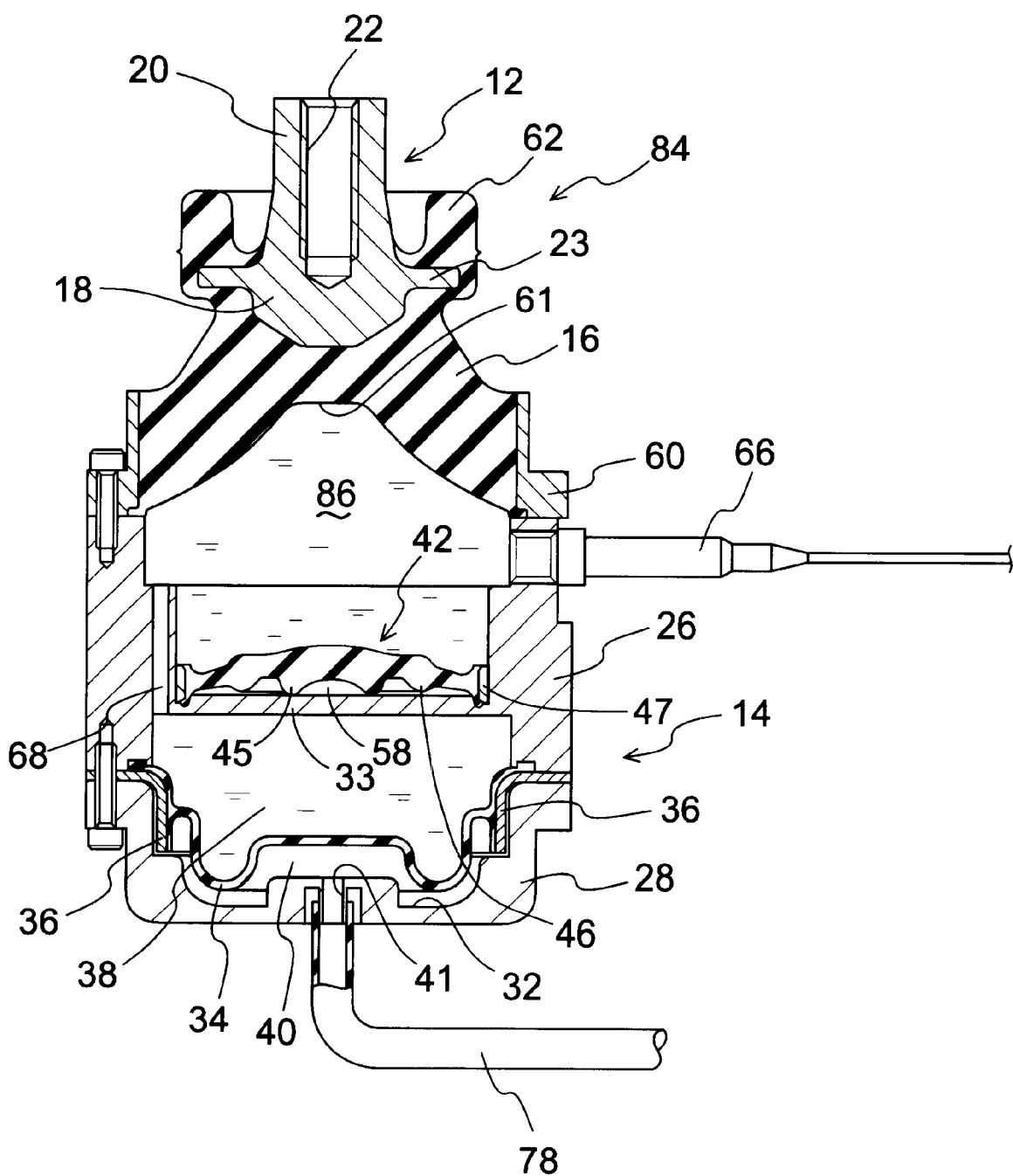
FIG. 5 is an elevational view in axial or vertical cross section of a fluid-filled vibration-damping device in the form of an engine mount constructed according to a second embodiment of the invention.

Referring next to FIG. 5, an engine mount 84 constructed according to the second preferred embodiment of the present invention is shown. The present engine mount 84 is identical to the engine mount 10 of the first embodiment, except in that a single pressure-receiving chamber 86 is partially defined by and formed between the elastic body 16 and the rubber plate 42, rather than a pair of primary and auxiliary fluid chambers 64, 56. In the following description as to the second embodiment, the same reference numerals as used in the first embodiment will be used to identify the functionally corresponding elements, and redundant descriptions of those elements will not be provided.

In the present engine mount 84, the pressure of the fluid in the pressure-receiving chamber 86 is periodically changed due to the elastic deformation of the elastic body 16, upon application of vibrational loads between the first and second mounting members 12, 14. Due to the periodic pressure change of the fluid in the pressure-receiving chamber 86, the rubber plate 42 partially defining the pressure-receiving chamber 86 is also elastically deformed, causing resonance-like flows of the fluid or the fluid pressure change within the pressure-receiving chamber 86. Therefore, the present engine mount 84 is capable of exhibiting desired vibration damping or isolating effect, like in the engine mount 10 of the first embodiment, based on the resonance-like flows of the fluid within the pressure-receiving chamber 86.

It is noted that the frequency of the flows of the fluid generated within the pressure-receiving chamber 86 upon application of the vibrational load, may be suitably tuned by changing the density of the fluid, the wall spring stiffness of the elastic body 16, the internal surface shape of the pressure-receiving chamber 86, and the spring characteristics, e.g., the wall spring stiffness of the rubber plate 42.

The engine mount 84 constructed according to the second embodiment of the present invention makes it possible to make a cross sectional area of the substantial flow pass of the fluid filled within the pressure-receiving chamber 86 sufficiently larger than the orifice passages 68, 74 in the engine mount 10 of the first embodiment. Therefore, the engine mount 84 can exhibit with ease an excellent vibration damping effect with respect to vibrations having higher frequencies, such as a high-speed booming noise.

In the present engine mount 84, the internal air chamber 58 partially defined by the lower surface of the rubber plate 42, which is remote from the pressure-receiving chamber 86, is not exposed to the atmosphere and fluid-tightly enclosed within the engine mount 84. Therefore, the lower surface of the rubber plate 42 is subjected to an air spring force caused by the air enclosed within the internal air chamber 58.

In the first embodiment, the vacuum tank 76 is provided in a part of the air conduit 78 through which the negative pressure applied from the negative source to the working air chamber 40. The provision of the vacuum tank 76 is effective to reduce or eliminate the amount of variation of the air pressure in the working air chamber 40, which may arise from the switching operation of the pressure-regulating switch valve 80 to alternately connect and disconnect the working air chamber 40 to and from the vacuum source and/or the atmosphere, or may arise from variation of the air pressure in the vacuum source. Various kinds of pressure variation reducing devices like a surge tank and an accumulator, or various types of muffler or silencer may be used as the vacuum tank 76. The vacuum tank 76 may be an accumulator of a diaphragm type, a piston type or a spring type, for example. Alternatively, the vacuum tank 76 may be a muffler or silencer of a side branch type, an interference muffler type or a blower muffler type. It is noted that the vacuum tank 76 is not essential to practice the present invention.

In the illustrated embodiments, the present invention is applied to one type of the engine mount wherein the first and second mounting members 12, 14 are opposite to each other with a suitable amount of spacing, in one direction, e.g., a vertical direction. The present invention may be applicable to other types of the engine mounts, for instance, to a engine mount for a FF (front-engine/front-drive) motor vehicle, which includes an inner sleeve member as a first mounting member and an outer sleeve member as a second mounting member disposed radially outwardly of the inner sleeve member, that are elastically connected with each other by an elastic body interposed therebetween.

In addition, the principle of the present invention is applicable not only an engine mount for mounting an engine of an automotive vehicle on the vehicle body in a vibration damping manner, but also other vibration damping devices for automotive vehicles, such as body mounts, and differential mounts, and various kinds of vibration damping devices for various devices or equipment other than the automotive vehicles.

It is to be understood that the present invention may be embodied with various other changes, modifications and improvements, which may occur to those skilled in the art, without departing from the spirit and scope of the invention defined in the following claims:

What is claimed is:

1. A fluid-filled vibration damping device comprising:
    a first and a second mounting member, which are spaced apart from each other;
    an elastic body elastically connecting said first and second mounting members and partially defining a pressure-receiving chamber, said pressure-receiving chamber being filled with a non-compressible fluid whose pressure is changed upon application of a vibrational load between said first and second mounting members;
    an easily deformable flexible diaphragm partially defining an equilibrium chamber on one of opposite sides thereof, said equilibrium chamber being filled with said non-compressible fluid and has a volume easily variable;
    a first orifice passage for fluid communication between said pressure-receiving chamber and said equilibrium chamber;
    an elastic wall member being elastically displaceable and partially defining said pressure-receiving chamber;
    a restricting member disposed on one of opposing sides of said elastic wall member, the restricting member being disposed on the side of the elastic wall member opposite to said pressure-receiving chamber, said elastic wall member being pressed onto said restricting member based on elasticity of said elastic wall member when pressures on the opposing sides of the elastic wall member are equal such that said elastic wall member is displaceable away from said restricting member against said elasticity thereof;
    a working air chamber partially defined by the other side of said flexible diaphragm remote from said equilibrium chamber; and
    a negative pressure-regulating device adapted to apply different negative pressures to said working air chamber, depending upon frequencies of vibrations to be damped.

2. A fluid-filled vibration damping device according to claim 1, wherein at least one of said elastic wall member and said restricting member has an abutting projection projecting therefrom toward the other of said elastic wall member and said restricting member, said elastic wall member being partially pressed onto said restricting member at said abutting projection based on elasticity of said elastic wall member such that said abutting projection is displaceable away from said restricting member or said elastic wall member against said elasticity of said elastic wall member.

3. A fluid-filled vibration damping device according to claim 1, further comprising: a partition member which is adapted to divide said pressure-receiving chamber into a primary fluid chamber partially defined by said elastic body and an auxiliary fluid chamber partially defined by said elastic wall member; and a second orifice passage for fluid communication between said primary fluid chamber and said auxiliary fluid chamber, said second orifice passage being tuned to a frequency band which is higher than the frequency band to which said first orifice passage is tuned.

4. A fluid-filled vibration damping device according to claim 3, wherein one of said first and second mounting members is attachable to a power unit of the vehicle, and the other of said first and second mounting members is attachable to a body of the vehicle, such that the power unit is mounted on the body of the vehicle in a vibration damping fashion, said first orifice passage being tuned to a frequency band corresponding to that of engine shakes, said second orifice passage being tuned to a frequency band corresponding to a booming noise with said elastic wall member pressed to said restricting member while being tuned to a frequency band corresponding to engine idling vibrations with said working air chamber exposed to said negative pressure.

5. A fluid-filled vibration damping device according to claim 1, wherein said elastic wall member partially defines an interior space on the other side thereof remote from said pressure-receiving chamber, said interior space permitting a displacement of said elastic wall member and being exposed to the atmosphere through a communication hole.

6. A fluid-filled vibration damping device according to claim 1, further comprising a pressure detecting device for detecting a pressure value of said non-compressible fluid, wherein said negative pressure applied to said working air chamber is corrected based on said pressure value detected by said pressure detecting device.

7. A fluid-filled vibration damping device according to claim 1, further comprising: a pressure detecting device adapted to detect a pressure value of said non-compressible fluid; and a pressure correcting device adapted to correct a pressure value of said negative pressure applied to said working air chamber based on said pressure value of said non-compressible fluid.

8. A fluid-filled vibration damping device according to claim 1, further comprising: a vacuum tank for accumulating a negative pressure; a vacuum conduit for connecting said vacuum tank to an air intake system; an atmospheric conduit for connecting said vacuum tank to the atmosphere; and a switch valve for alternately connecting and disconnecting said vacuum tank to and from said vacuum conduit and/or said atmospheric conduit.

9. A fluid-filled vibration damping device according to claim 8, wherein said negative pressure-regulating device is adapted to control a duty ratio of said switch valve for regulating said negative pressure applied to said working air chamber.

10. A fluid-filled vibration damping device according to claim 1, wherein said second mounting member includes a recess open to said first mounting member and a partition wall disposed within said recess such that said partition wall is located in an intermediate portion of said recess as seen in a depth direction of said recess, so as to fluid-tightly divide a first interior space of said recess into a bottom-side space and an open-side pocket, said flexible diaphragm being disposed in said bottom-side space such that said flexible diaphragm fluid-tightly divide said bottom-side space into said equilibrium chamber and said working air chamber formed on said opposite sides of said flexible diaphragm, said elastic body elastically connecting said first mounting member and an open end portion of said open-side pocket of said second mounting member so that said open end portion of said open-side pocket is fluid-tightly closed by said elastic body, said elastic wall member being disposed in the bottom side of a second interior space of said open-side pocket such that a peripheral portion of said elastic wall member is supported by an inner wall surface of said open-side pocket, while being pressed onto said partition wall, said pressure-receiving chamber being partially defined by and formed between said elastic body and said elastic wall member.

* * * * *